United States Patent
Azpeitia Urquia et al.

(10) Patent No.: US 11,802,805 B2
(45) Date of Patent: *Oct. 31, 2023

(54) SEMICONDUCTOR DEVICE FOR AMBIENT SENSING INCLUDING A CAVITY AND A MECHANICAL FILTERING STRUCTURE

(71) Applicant: STMICROELECTRONICS S.r.l., Agrate Brianza (IT)

(72) Inventors: Mikel Azpeitia Urquia, Milan (IT); Giorgio Allegato, Monza (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/958,761

(22) Filed: Oct. 3, 2022

(65) Prior Publication Data

US 2023/0029120 A1 Jan. 26, 2023

Related U.S. Application Data

(63) Continuation of application No. 17/168,059, filed on Feb. 4, 2021, now Pat. No. 11,513,016.

(30) Foreign Application Priority Data

Feb. 25, 2020 (IT) ........................ 102020000003862

(51) Int. Cl.
*G01L 9/00* (2006.01)
*G01L 19/06* (2006.01)
*G01L 9/08* (2006.01)
*G01L 9/12* (2006.01)

(52) U.S. Cl.
CPC ............ *G01L 19/0636* (2013.01); *G01L 9/08* (2013.01); *G01L 9/12* (2013.01)

(58) Field of Classification Search
None
See application file for complete search history.

(56) References Cited

U.S. PATENT DOCUMENTS

| 5,062,302 | A | 11/1991 | Petersen et al. |
| 7,526,962 | B1 * | 5/2009 | Kurtz ...................... G01L 19/14 |
| | | | 73/756 |
| 11,513,016 | B2 * | 11/2022 | Azpeitia Urquia ....... G01L 9/12 |
| 2003/0167852 | A1 * | 9/2003 | Traverso ............. G01L 19/0636 |
| | | | 73/756 |

(Continued)

FOREIGN PATENT DOCUMENTS

CN 107539941 A 1/2018
EP 1420458 A2 5/2004

*Primary Examiner* — Brandi N Hopkins
*Assistant Examiner* — Nigel H Plumb
(74) *Attorney, Agent, or Firm* — SEED IP LAW GROUP LLP

(57) ABSTRACT

A semiconductor device for ambient sensing including: a cap traversed by a hole; and a main body mechanically coupled to the cap so as to delimit a cavity, which is interposed between the main body and the cap. The main body includes a semiconductor body and a coupling structure, which is interposed between the semiconductor body and the cap and laterally delimits a channel, which fluidically couples the cavity and the hole. The channel performs a mechanical filtering that is finer than the mechanical filtering performed by the hole.

20 Claims, 7 Drawing Sheets

(56) References Cited

U.S. PATENT DOCUMENTS

| | | | | |
|---|---|---|---|---|
| 2006/0169049 A1* | 8/2006 | Matsubara | ............ | B81B 7/0006 73/754 |
| 2013/0276544 A1* | 10/2013 | Potasek | ................ | B81B 7/0048 73/715 |
| 2014/0338459 A1* | 11/2014 | Besling | ................ | G01L 19/148 73/718 |
| 2015/0260593 A1* | 9/2015 | Hsu | ....................... | G01L 9/0072 73/754 |

\* cited by examiner

SEMICONDUCTOR DEVICE FOR AMBIENT SENSING INCLUDING A CAVITY AND A MECHANICAL FILTERING STRUCTURE

BACKGROUND

Technical Field

The present disclosure relates to a semiconductor device for ambient sensing, which includes a cavity that can be coupled to the external world and a mechanical filtering structure; moreover, the present disclosure regards a corresponding manufacturing process.

Description of the Related Art

As is known, numerous sensors known as ambient sensors are currently available, which supply electrical signals representing parameters of the environment in which they are positioned, such as for example pressure, temperature, humidity, presence of gas, etc. Inter alia, semiconductor devices that function as ambient sensors are known.

BRIEF SUMMARY

The present disclosure is directed to at least one embodiment of a semiconductor device, that includes a cavity, a cap, a hole extending through the cap, the hole having a diameter or a dimension, a main body coupled to the cap so as to delimit the cavity between the main body and the cap. The main body includes a semiconductor body, a coupling structure on the semiconductor body, the coupling structure between the semiconductor body and the main body, and a channel fluidically couples the hole to the cavity, the channel is laterally delimited by the coupling structure, the channel includes a first sidewall and a second sidewall opposite to the first sidewall, the filtering channel has a dimension that extends from the first sidewall to the second sidewall, the dimension is less than the diameter of the hole. The hole is configured to provide a first filtering and the channel is configured to provide a second filtering that is finer than the first filtering by the hole.

The present disclosure is also directed to a semiconductor device, includes a cap, a filtering hole that extends through the cap, where the filtering hole has a diameter. The semiconductor device includes a cavity and a main body coupled to the cap so as to delimit the cavity between the main body and the cap. The main body includes a semiconductor body, a coupling structure between the semiconductor body and the cap, and a filtering channel fluidically couples the cavity and the hole, the filtering channel is laterally delimited by the coupling structure, the filtering channel has a first sidewall and a second sidewall opposite to the first sidewall, the filtering channel has a dimension that extends from the first sidewall to the second sidewall, the dimension is less than the diameter of the filtering hole. The semiconductor device includes a first opening delimited by the channel, the first opening in fluid communication with the hole, and a second opening delimited by the channel in fluid communication with a part of the cavity and laterally staggered from the first opening.

BRIEF DESCRIPTION OF THE SEVERAL VIEWS OF THE DRAWINGS

For a better understanding of the present disclosure, preferred embodiments thereof will now be described, purely by way of non-limiting example, with reference to the attached drawings, wherein.

DETAILED DESCRIPTION

Figure 1:
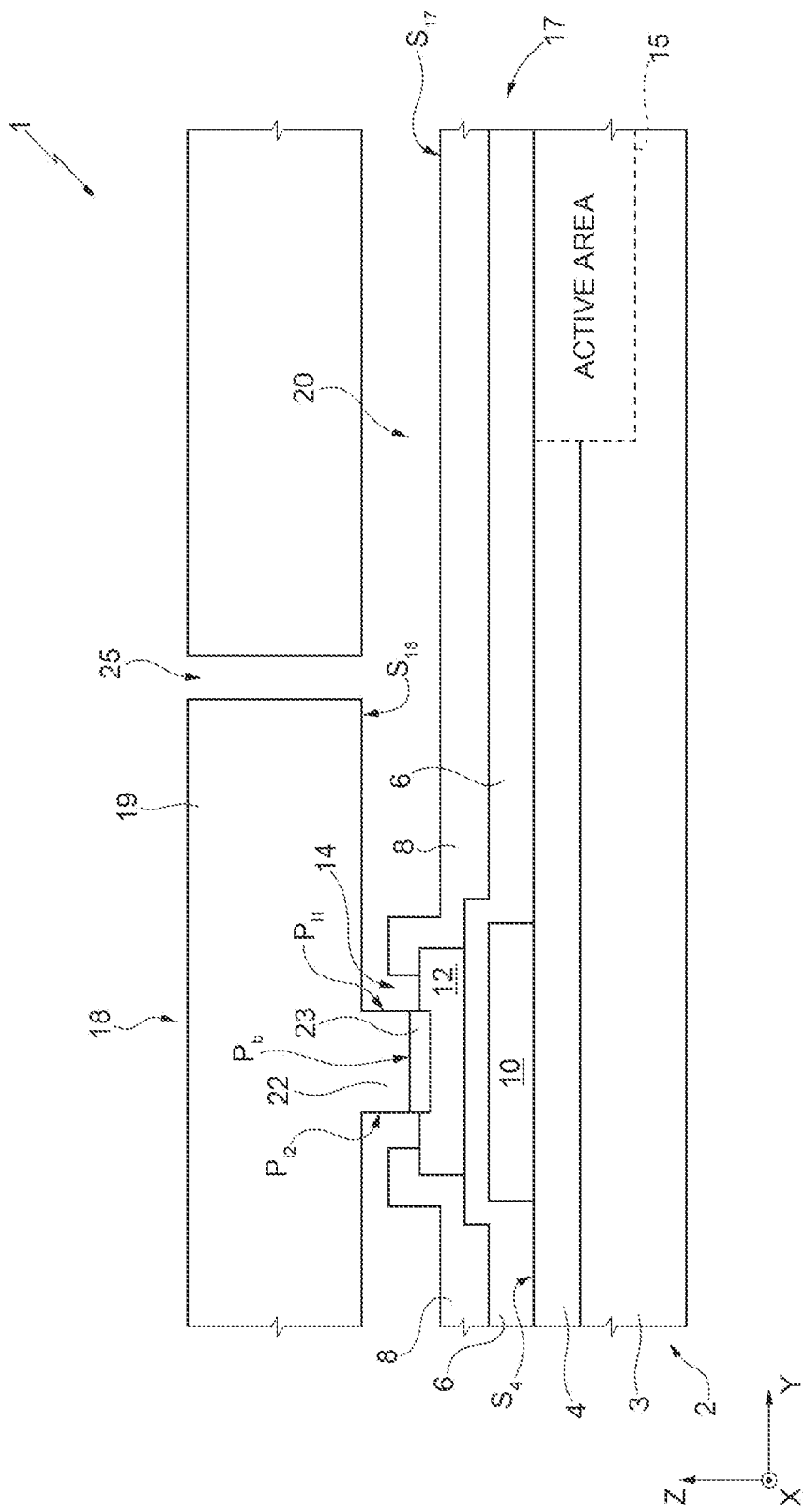
FIG. 1 is a schematic illustration of a portion of a cross-section of an ambient sensing device of a known type.

FIG. 1 shows a portion of a section of a sensing device 1 that comprises a semiconductor body 2, which in turn comprises a substrate 3, made, for example, of silicon, and an overlying epitaxial region 4, formed by one or more epitaxial layers and defining a first surface S4, which delimits the semiconductor body 2 at the top.

The sensing device 1 further comprises a first passivation layer 6, formed by a dielectric material (for example, oxide) and arranged on the first surface S4, and a second passivation layer 8, formed by a dielectric material (for example, nitride) and arranged on the first passivation layer 6.

The sensing device 1 further comprises a plurality of metallizations, which extend in the region formed by the first and second passivation layers 6, 8. For instance, a first bottom metallization 10 and a first top metallization 12, which are made of metal material, are visible in FIG. 1. The first bottom metallization 10 is arranged on the first surface S4, in contact with the epitaxial region 4, and is overlaid by the first passivation layer 6. The first top metallization 12 is arranged on the first passivation layer 6 and overlies, at a distance, the first bottom metallization 10. In addition, the second passivation layer 8 in part overlies the first top metallization 12. In particular, the second passivation layer 8 extends over the first top metallization 12 so as to leave a part of the latter exposed, i.e., so as to define a window 14 that faces the exposed part of the first top metallization 12, referred to in what follows as the sealing window 14.

The sensing device 1 further comprises an active area 15, which typically extends from the first surface S4, within an underlying portion of the epitaxial region 4 and within a substrate portion 3 underlying the latter. The active area 15 is coated with the first and second passivation layers 6, 8 and is typically laterally staggered with respect to the metallizations. Furthermore, albeit not illustrated, the active area 15 may be electrically connected to the first bottom metallization 10 and/or to further electrical terminals (not illustrated), which are designed to enable the electrical connection to the external world. The first top metallization 12 may have an electrical function (for example, it may be connected to the ground of the sensing device 1) or may be without any electrical function.

In practice, the semiconductor body 2 and the first and second passivation layers 6, 8 form a main body 17 of the sensing device 1, which is delimited at the top by a second surface $S_{17}$, formed by the second passivation layer 8.

The sensing device 1 further comprises a cap 18 formed by semiconductor material (for example, silicon), which overlies, at a distance, the main body 17, so as to delimit a cavity 20. In particular, the cap 18 comprises a respective primary body 19, which has a planar shape and is delimited at the bottom by a third surface $S_{18}$, and a projecting region 22, which extends downwards, starting from the third surface Sib, in the direction of the main body 17. Although visible in FIG. 1, the projecting region 22 has a closed and hollow shape (for example, the shape of an annulus or of a rectangular frame) and is arranged so that, in top view (not illustrated), it surrounds the active area 15. Moreover, the projecting region 22 forms a single piece with the primary body 19 of the cap 18. The first surface S4 faces towards the cap 18.

In greater detail, assuming that the projection 22 has an annular shape and has, in top view, the shape of an annulus, it includes a first and a second side wall $P_{11}$, $P_{12}$, which define cylindrical profiles, and a bottom wall $P_b$.

The sensing device 1 further comprises a junction region 23, which is formed, for example, by a germanium-aluminum eutectic alloy and extends underneath the bottom wall $P_b$ of the projection 22, with which it is in direct contact, until it penetrates partially within the first top metallization 12.

In practice, the junction region 23 extends within the sealing window 14, in contact with the underlying first top metallization 12 so as to function as junction between cap 18 and main body 17. For this purpose, also the junction region 23 and the first top metallization 12 are ring-shaped; i.e., they have shapes that are closed, in top view, and are hollow.

The projecting region 22, the junction region 23 and the first top metallization 12 form a ring-like structure that laterally delimits the cavity 20 and acts as a lateral seal. The cavity 20 is moreover delimited, at the bottom, by a corresponding portion of the second passivation layer 8 that overlies the active area 15. The cavity 20 is moreover delimited, at the top, by a portion of the primary body 19 of the cap 18, which overlies, at a distance, the active area 15. The active area 15 may be referred to as an active portion, an active region, or some other similar language.

Extending through the primary body 19 of the cap 18 is a hole 25, i.e., a through cavity, a through hole, or a recess, which sets the cavity 20 in fluidic communication with the external world.

In practice, the cavity 20 is sealed, except for the presence of the hole 25, which has, for example, a cylindrical shape.

Once again with reference to FIG. 1, the complete section of the sensing device 1 can be obtained by flipping over the portion illustrated in FIG. 1, except for the hole 25.

All this having been said, assuming for example that the sensing device 1 acts as pressure sensor, in use the air penetrates into the cavity 20 through the hole 25. Furthermore, the active area 15 operates so as to vary at least one electrical quantity, as a function of a parameter (in particular, the pressure) of the air present in the cavity 20. The variation of said electrical quantity represents an electrical signal indicative of the aforementioned parameter, which can be supplied, for example, to an external processing device (not shown). In particular, in the case of a pressure sensor, the active area may include a deformable membrane (not shown) as a function of the pressure in the cavity 20 and is coupled to a piezoelectric, piezoresistive or capacitive sensor (not illustrated).

The hole 25, in addition to enabling access of air (or more in general of a fluid) into the cavity 20, also functions as a mechanical filter in the sense that it prevents access to the cavity 20 by undesired particles, which could, for example, damage the sensing device 1 or in any case alter the operation thereof. Said filtering function is performed both during use of the sensing device 1 and prior to use, i.e., during the process of manufacturing of the sensing device 1, for example during the so-called back-end operations.

Currently, the hole 25 is formed after a first and a second semiconductor wafer, which are to form the cap 18 and the main body 17, respectively, have been bonded together, following upon dicing operations. In this way, however, it is not possible to form holes with diameters of less than 10 µm. Said lower limit may prove insufficient for certain applications, such as for example applications that use the cavity 20 to be inaccessible to water. In fact, it is known that, in order to prevent water from entering the cavity 20, the diameter of the hole 25 should be not greater than (approximately) 1 µm.

Figure 2:
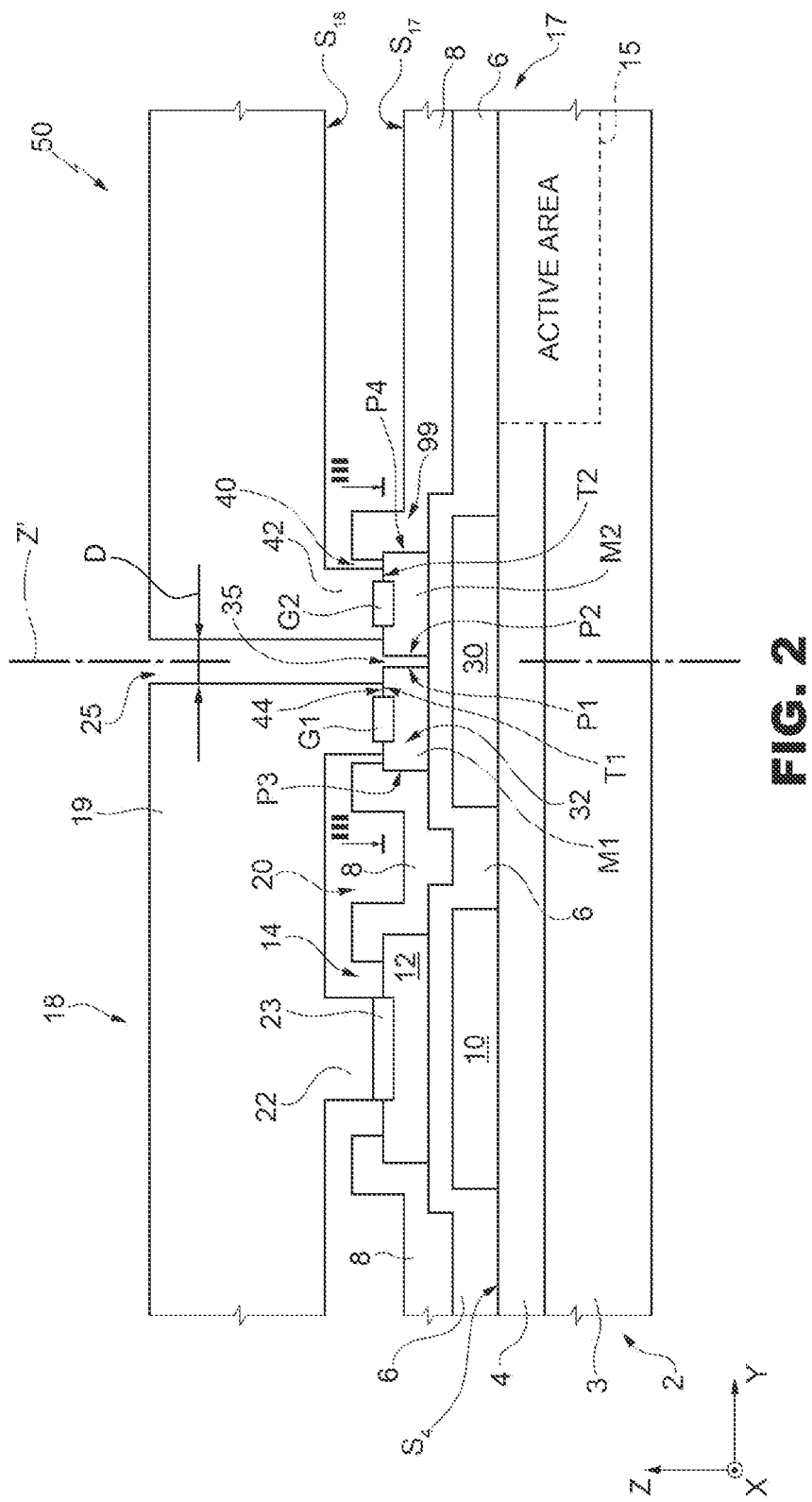
FIG. 2 is a schematic illustration of a portion of a cross-section of an embodiment of the present sensing device.

FIG. 2 shows an ambient sensing device 50 of the semiconductor type, which, for reasons of brevity and without this implying any loss of generality, is now described with reference to the differences with respect to the sensing device 1 illustrated in FIG. 1. Elements already present in the sensing device 1 shown in FIG. 1 are designated by the same or similar reference numbers, except where otherwise specified.

In detail, and without this implying any loss of generality, the ambient sensing device 50 comprises a second bottom metallization 30, which is co-planar with the first bottom metallization 10, and is therefore arranged on the first surface S4, in contact with the epitaxial region 4, and is overlaid by the first passivation layer 6. Moreover, the second bottom metallization 30 is laterally staggered with respect to the first bottom metallization 10, in the direction of the active area 15 so as to be arranged underneath the cavity 20. The first and second bottom metallizations 10, 30 may or may not be in electrical contact.

The ambient sensing device 50 further comprises a top metallization structure 32, which in turn comprises a pair of metallizations, referred to in what follows as the first and second filtering metallizations M1, M2. The first and second filtering metallizations M1, M2 may be referred to as metal layers, metallization layers, filtering metallization layers, or filtering metallization portions.

The first and second filtering metallizations M1, M2 are co-planar and are arranged laterally staggered over the part of first passivation layer 6 that coats the second bottom metallization 30.

In detail, the first and second filtering metallizations M1, M2 have a same thickness (for example, equal to 1 µm), are made, for example, of aluminum, and are laterally staggered so as to delimit a channel 35 having an elongated shape, which extends in a direction parallel to an axis X of an orthogonal reference system XYZ such that the plane XY is parallel to the first surface S4.

Figure 3:
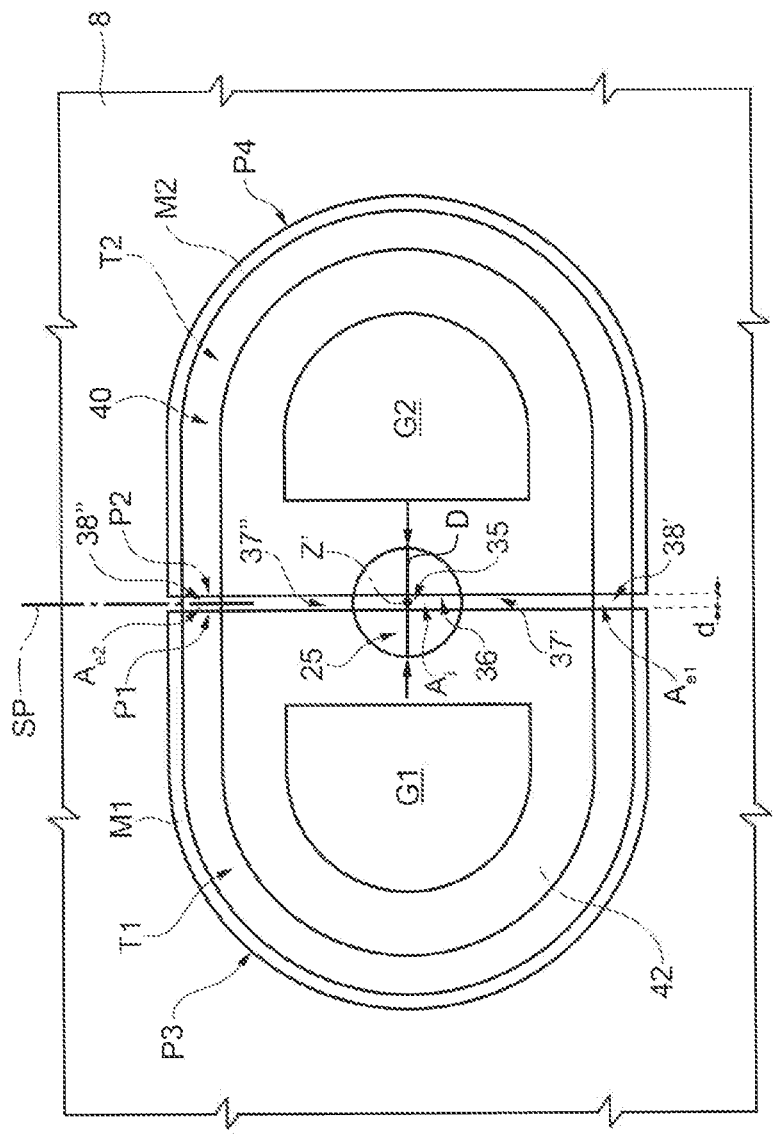
FIG. 3 is a schematic illustration of a cross-section of the sensing device represented in FIG. 2, taken along a plane shown in FIG. 2.

In greater detail, as shown in FIG. 3, the first and second filtering metallizations M1, M2 have, for example, shapes symmetrical with respect to a plane of symmetry SP, parallel to the plane XZ. In addition, the first and second filtering metallizations M1, M2 are delimited, respectively, by a first and a second side wall P1, P2, which have the shape of rectangles parallel to the plane ZX and face one another. The first and second side walls P1, P2, laterally delimit the channel 35; furthermore, the channel 35 is delimited at the bottom by the first passivation layer 6.

Moreover, the first and second filtering metallizations M1, M2 are also laterally delimited by a third and a fourth side wall P3, P4, respectively, each of which has, for example, a curved shape with single concavity, with concavities opposite to one another. Without this implying any loss of generality, the first and second filtering metallizations M1, M2 have a shape of two half-shells arranged in front of one another, the envelope of which defines, approximately and in top view, a flattened ellipse along the minor axis. In addition, the first and second filtering metallizations M1, M2 are delimited at the top, respectively, by a first and a second top surface T1, T2, which are mutually co-planar and parallel to the plane XY.

The second passivation layer 8 coats a peripheral portion of the ensemble formed by the first and second filtering metallizations M1, M2 so as to delimit a window 40, referred to in what follows as a filtering window 40. The filtering window 40 may be referred to as a filtering opening, a filtering channel, or a filtering space.

The filtering window 40 has a closed shape, in top view, and faces the first and second top surfaces T1, T2; for example, the filtering window 40 has an approximately elliptical shape. In particular, the second passivation layer 8 extends on peripheral portions of the first and second top surfaces T1, T2, and hence covers the third and fourth side walls P3, P4, whereas the filtering window 40 faces central portions of the first and second top surfaces T1, T2. The filtering window 40 then leaves the first and second side walls P1, P2, and hence the channel 35, exposed. The filtering window 40 has a first portion that is overlapping the first metallization M1 and a second portion that is overlapping the second metallization M2. The first and second portions having a U-shape.

The cap 18 further comprises a projecting region 42, referred to in what follows as the projecting filtering region 42. The projecting filtering region 42 may be referred to as a projecting portion, a protruding region, a protruding portion, an extension region, or an extension portion.

The projecting filtering region 42 extends downwards, starting from the third surface $S_{18}$, in the direction of the main body 17. Moreover, the projecting filtering region 42 is made of the same material (for example, a semiconductor) as the primary body 19 of the cap 18, with which it forms a single piece.

In greater detail, as may be seen in FIG. 3, in top view the projecting filtering region 42 has, for example and to a first approximation, the shape of a flattened ellipse along the minor axis so as to form a profile including two parallel segments, the ends of which are connected by a pair of curved lines.

In addition, the projecting filtering region 42 extends at the bottom until it partially penetrates into the filtering window 40. In this connection, without this implying any loss of generality, the projecting filtering region 42 has a cross-section with an area smaller than the area of the filtering window 40 and extends within the latter, without contacting the second passivation layer 8, hence without contacting the edge of the filtering window 40. These areas of the cross-sections of the projecting filtering region 42 and the filtering window 40 may be referred to as cross-sectional areas or some other similar language. Furthermore, the projecting filtering region 42 is delimited, at the bottom, by a surface 44 (referred to in what follows as the coupling surface 44), which is parallel to the plane XY and overlies, in direct contact, the first and second top surfaces T1, T2 of the first and second filtering metallizations M1, M2. The projecting filtering region 42 is coupled to the first and second filtering metallizations M1, M2.

The hole 25 extends not only through the primary body 19 of the cap 18 but also through the projecting filtering region 42, until the hole 25 gives out onto or terminates at the coupling surface 44. Purely by way of example, the hole 25 has an axis (designated by Z' in FIGS. 2 and 3), which lies in the plane of symmetry SP. To a first approximation, the axis (not shown) of the channel 35 is parallel to the axis X and lies in the plane of symmetry SP.

Without this implying any loss of generality, the projecting filtering region 42 and the filtering window 40 each have shapes symmetrical with respect to the plane of symmetry SP. Moreover, in the embodiment illustrated in FIG. 3, the channel 35 is symmetrical with respect to the plane of symmetry SP; in particular, the channel 35 has the shape of a parallelepiped.

The ambient sensing device 50 further comprises a first and a second junction region G1, G2, which are made, for example, of an aluminum-germanium eutectic alloy and are approximately symmetrical with respect to the plane of symmetry SP. The first and second junction regions G1, G2 fix the projecting filtering region 42 to the top metallization structure 32.

In greater detail, the first junction region G1 is interposed, in direct contact, between the projecting filtering region 42 and the first filtering metallization M1. In particular, a bottom portion of the first junction region G1 extends underneath the first top surface T1, and hence also underneath the coupling surface 44, within the first filtering metallization M1, whereas a top portion of the first junction region G1 extends above the first top surface T1, and hence also above the coupling surface 44, within the projecting filtering region 42.

Likewise, the second junction region G2 is interposed, in direct contact, between the projecting filtering region 42 and the second filtering metallization M2. In particular, a bottom portion of the second junction region G2 extends underneath the second top surface T2, and hence also underneath the coupling surface 44, within the second filtering metallization M2, whereas a top portion of the second junction region G2 extends above the second top surface T2, and hence also above the coupling surface 44, within the projecting filtering region 42.

Without this implying any loss of generality, the first and second junction regions G1, G2 have planar shapes and are separate from one another. In top view, the first and second junction regions G1, G2 are arranged on opposite sides of the channel 35, as well as at a distance from the channel 35 and from the hole 25.

In greater detail, the dimension of the hole 25, denoted by D, is, for example equal to 10 µm. Moreover, the width of the channel 35, denoted by d, understood as the distance between the first and second side walls P1, P2, may be less than 10 µm and equal, for example, to 1 µm. In addition, the channel 35 has a height, measured in a direction parallel to the axis Z, equal to the thickness of the first and second filtering metallizations M1, M2, and hence, as mentioned previously, for example equal to 1 µm. The first and second junction regions G1, G2 have a thickness (in a direction parallel to the axis Z) for example of 1. In some embodiments, the hole 25 may have a circular, rectangular, square, diamond, or some other type of shape or cross-section. When the hole 25 has the circular shape, the dimension D is a diameter, which can be clearly seen in FIG. 3. When the hole has the rectangular shape, the dimension D may extend from a first sidewall of the rectangle to a second sidewall of the rectangle opposite to the first sidewall. When the hole is has the diamond shape, the dimension D may extend from a first point to a second point opposite to the first point.

The channel 35 hence has a cross-section (in planes parallel to the plane ZY), which is approximately rectangular and has an area smaller than the area of the cross-section (in planes parallel to the plane XY) of the hole 25. These areas of the cross-sections of the hole 25 and the channel 35 may be referred to as cross-sectional areas or some other similar language.

Once again with reference to the hole 25, a bottom portion thereof faces an underlying portion of the channel 35, with which it is hence in fluidic communication. In greater detail, as shown in FIG. 3, the channel 35 comprises a central portion 36, through which the axis Z' passes; said central portion 36 is overlaid by the hole 25.

Furthermore, the channel 35 comprises a first and a second intermediate portion 37', 37", which are arranged in a symmetrical way with respect to the central portion 36, to which they are adjacent. The first and second intermediate portions 37', 37" are closed at the top by corresponding portions of the projecting filtering region 42.

The channel 35 further comprises a first and a second peripheral portion 38', 38", which are adjacent, respectively, to the first and second intermediate portions 37', 37". The first and second peripheral portions 38', 38" are symmetrical with respect to the ensemble formed by the central portion 36 and the first and second intermediate portions 37', 37". Moreover, in top view, the first and second peripheral portions 38', 38" are arranged on the outside of the projecting filtering region 42.

In greater detail, while the projecting filtering region 42 occupies a central portion of the filtering window 40, the first and second peripheral portions 38', 38" of the channel 35 face corresponding peripheral portions of the overlying filtering window 40, which communicate with the cavity 20. In turn, the cavity 20 is coupled to the hole 25 through the first and second peripheral portions 38', 38" of the channel 35, which define corresponding lateral openings of the channel 35, which face upwards (designated, respectively, by $A_{e1}$ and $A_{e2}$ in FIG. 3). The channel 35 is moreover centrally coupled to the hole 25 through a corresponding opening defined by the central portion 36 (designated by $A_i$), said opening $A_i$ also facing upwards.

Purely by way of example, the first and second peripheral portions 38', 38" of the channel 35 have a length (measured in a direction parallel to the axis X) for example, of 10 μm.

Operatively, the first and second filtering metallizations M1, M2, the filtering window 40, the first and second junction regions G1, G2 and the projecting filtering region 42 form a filtering structure 99 (FIG. 2), which sets the cavity 20 in fluidic communication with the hole 25, and hence enables a fluid present in the external world to penetrate into the cavity 20 so as to enable the active area 15 to vary, for example, the value of at least one electrical parameter, as a function of a chemical or physical characteristic of the fluid, and thus enable measurement of this characteristic. In addition, on account of the small cross-section of the channel 35, the filtering structure 99 acts as a mechanical filter, which prevents entry into the cavity 20 of undesired particles, which, according to the application and the consequent sizing of the channel 35, may include solid particles, fluid particles (for example, drops of water), etc. In particular, on account of the small cross-section, the channel 35 performs a mechanical filtering that is finer than would be obtained by just the hole 25.

Once again with reference to the filtering capacity of the filtering structure 99, this enables the hole 25 to have the dimensions that can be obtained using current manufacturing processes since the task of filtering is not performed by the hole 25. Furthermore, the filtering structure 99 may be produced by means of so-called front-end manufacturing techniques, as described hereinafter.

Figure 4:
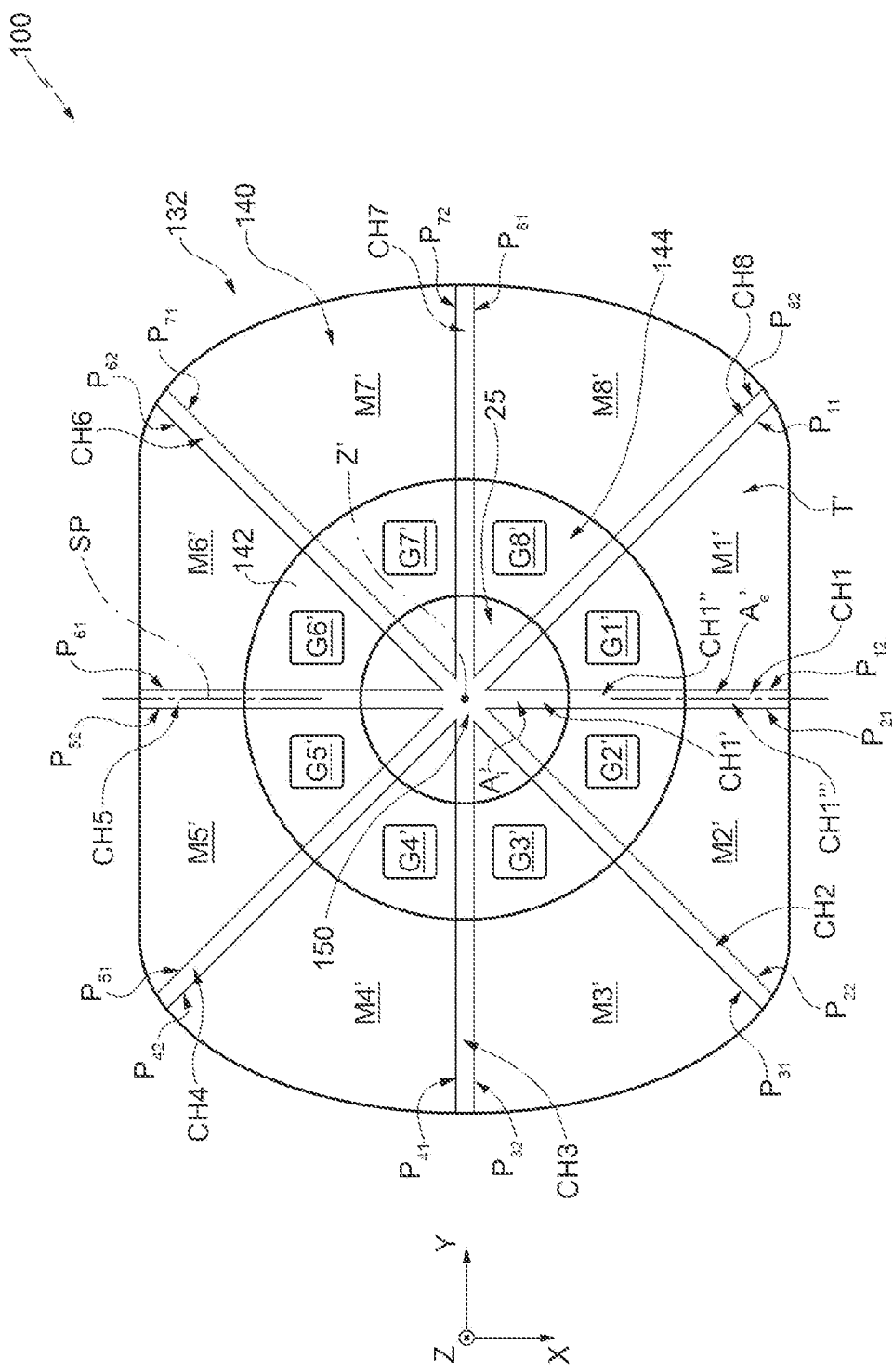
FIG. 4 is a schematic top view of a further embodiment of the present sensing device, with portions removed.

Embodiments that include a number of channels are moreover possible, as shown for example in FIG. 4, where an ambient sensing device 100 is illustrated, which is now described as regards the differences with respect to the ambient sensing device 50. For simplicity of representation, FIG. 4 does not illustrate the second passivation layer 8.

In detail, the top metallization structure, here designated by 132 comprises eight filtering metallizations, designated, respectively, by M1'-M8', which are planar and mutually co-planar, have the same thickness, and are made of a same metal material (for example, aluminum).

The filtering metallizations M1'-M8' are arranged angularly so that adjacent filtering metallizations delimit a corresponding channel; the channels are here designated by CH1-CH8.

To a first approximation, in top view the filtering metallizations M1'-M8' have the shape of wedges of a region equal to the envelope of the filtering metallizations M1'-M8', each of these wedges being laterally delimited by corresponding pairs of rectangular plane side walls that depart from a corresponding vertex. In particular, the wedge of the i-th filtering metallization Mi' is delimited by a respective first side wall Pi1 and by a respective second side wall Pi2. The i-th channel CHi is laterally delimited by the first side wall and the second side wall, which delimit, respectively, a first and a second filtering metallization that are angularly adjacent to one another, said first and second side walls being parallel to one another.

Without this implying any loss of generality, the axes (not illustrated) of the channels CH1-CH8 are angularly equispaced, with a spacing of 45°.

In practice, the channels CH1-CH8 depart radially, in a symmetrical way with respect to the axis Z', starting from a central volume 150, arranged underneath the hole 25, and on which the vertices of the wedge-like shapes of the filtering metallizations M1'-M8' face.

The projecting filtering region, here designated by 142, has, for example, a cylindrical shape, in which the hole 25 extends, which overlies the aforementioned central volume 150.

With reference for brevity only to the first channel CH1 (but the same considerations apply to the other channels CH2-CH7), the hole 25 overlies a corresponding central portion (designated by CH1'), which is adjacent to the central volume 150; the central portion CH1' hence communicates with the hole 25. In addition, the projecting filtering region 142 closes, at the top, an intermediate portion CH1" of the first channel CH1, which is interposed between the central portion CH1' and a peripheral portion CH1''' of the first channel CH1. In top view, the peripheral portion CH1''' is arranged on the outside of the projecting filtering region 142, within the filtering window, designated by 140 in FIG. 4 (where for simplicity the filtering window 140 is assumed to coincide, in top view, with the envelope of the filtering metallizations M1'-M8'). In practice, whereas the projecting filtering region 142 occupies a central portion of the filtering window 140, the peripheral portion CH1''' of the first channel CH1 faces a corresponding peripheral portion of the overlying filtering window 140, so as to communicate with the cavity 20 (not illustrated in FIG. 4). The cavity 20 is hence coupled to the hole 25 through the central portion CH1' and the peripheral portion CH1''' of the first channel CH1, which define corresponding lateral openings of the first channel CH1, facing upwards and designated, respectively, by $A_i'$ and $A_e'$.

The ambient sensing device 100 further comprises, for each filtering metallization M1'-M8', a corresponding junction region G1'-G8', which is made, for example, of a germanium-aluminum eutectic alloy and is interposed, in direct contact, between the corresponding filtering metallization M1'-M8' and the projecting filtering region 142. Without this implying any loss of generality, to a first approximation the junction regions G1'-G8' are angularly equispaced and are arranged, in top view, outside of the hole 25.

In greater detail with reference, for simplicity, to just the first filtering metallization M1' and to the first junction region G1' (but the same considerations apply to the other filtering metallizations M2'-M8' and the other junction regions G2'-G8'), and referring to the first top surface T1' to indicate the surface that delimits the first filtering metallization M1' at the top, and referring to the coupling surface 144 to indicate the surface that delimits the projecting filtering region 142 at the bottom, what is described hereinafter occurs.

The coupling surface 144 and the first top surface T1' are approximately co-planar since the projecting filtering region 142 contacts the first filtering metallization M1'. Furthermore, albeit not shown, a bottom portion of the first junction region G1' extends underneath the first top surface T1', within the first filtering metallization M1', whereas a top portion of the first junction region G1' extends above the first top surface T1', within the projecting filtering region 142, similarly to what is illustrated in FIG. 2.

The width of each of the channels CH1-CH8 (measured in a direction perpendicular to the radial direction) is, for example, equal to the aforementioned width d. Moreover, the channels CH1-CH8 perform the same function of mechanical filtering as that performed by the channel 35 of the embodiment illustrated in FIGS. 2 and 3, affording the same advantages.

The embodiments described envisage fluidic coupling of the cavity 20 to the hole 25, through one or more channels, each of which has at least a section, in a plane perpendicular to its own direction of extension, that has an area smaller than the area of the section of the hole 25 that has the minimum area from among the sections of the hole 25 in planes perpendicular to the direction of extension of the hole 25. In addition, or as an alternative, it is possible for the function of fine filtering to be performed by at least one of the aforementioned upward-facing openings of the channel, in which case said opening/s has/have an area smaller than the area of the section of the hole 25 that has the minimum area from among the sections of the hole 25 in planes perpendicular to the direction of extension of the hole 25.

Advantageously, the present ambient sensing device can be manufactured by implementing the following manufacturing process, which is described with reference, by way of example, to manufacturing of the ambient sensing device illustrated in FIGS. 2 and 3.

Figure 5:
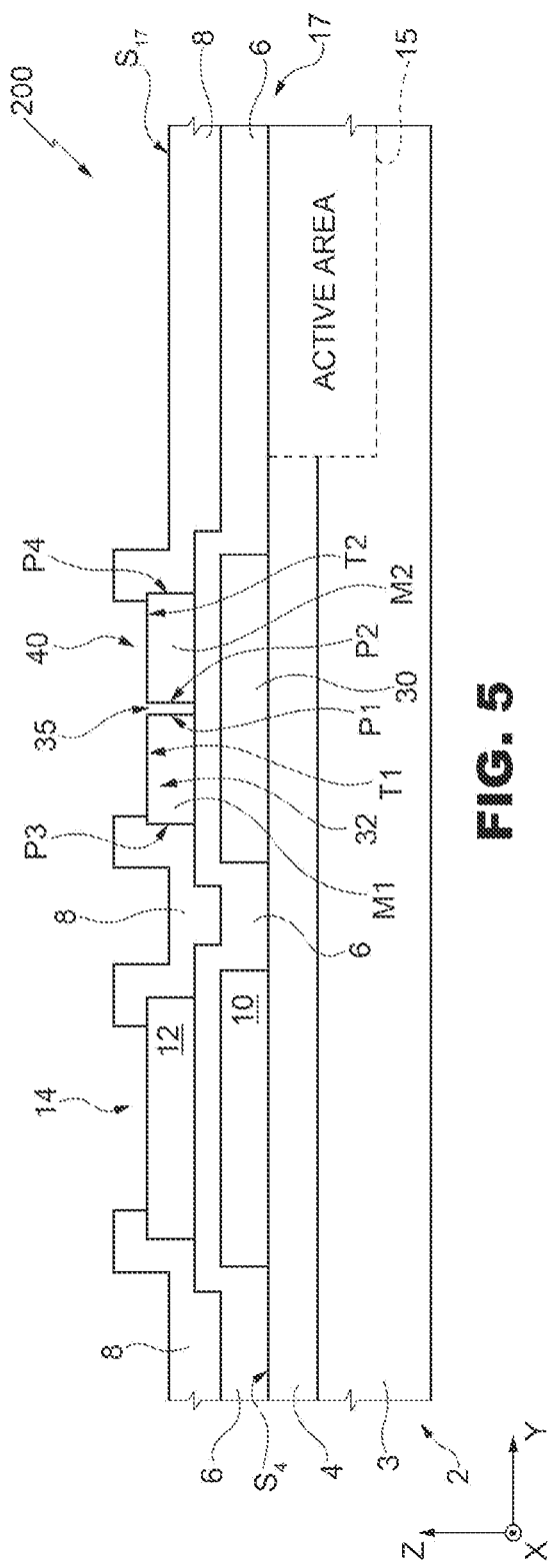
FIG. 5 is a schematic illustration of a portion of a cross-section of a first semiconductor wafer, during a step of a manufacturing process.

As shown in FIG. 5, initially a first semiconductor wafer 200 is provided, which is machined so as to form the main body 17. As a result, the first wafer 200 comprises the semiconductor body 2, the first and second bottom metallizations 10, 30, the first top metallization 12, the top metallization structure 32, the first and the second passivation layer 6, 8. In addition, the first wafer 200 comprises the sealing window 14 and the filtering window 40.

Furthermore, the first wafer 200 comprises the channel 35, which is, in fact, formed using so-called front-end techniques, by means of appropriate spacing of the first and second filtering metallizations M1, M2.

Figure 6:
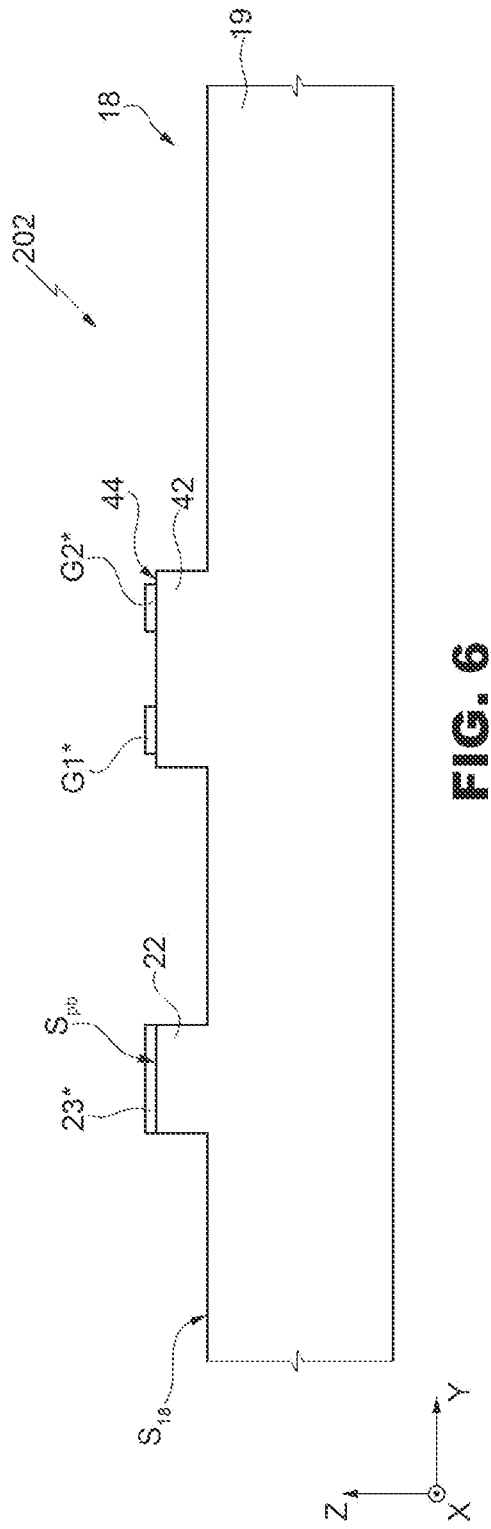
FIG. 6 is a schematic illustration of a portion of a cross-section of a second semiconductor wafer, during a step of the manufacturing process.

Moreover, as shown in FIG. 6, a second semiconductor wafer 202 is provided, which forms the cap 18. In particular, the second wafer 202 is machined so as to form the primary body 19, the projecting region 22, the projecting filtering region 42 and the hole 25.

The projecting filtering region 42 is delimited, at the top, by the coupling surface 44, on which a first and a second preliminary region G1*, G2* extend, which are made, for example, of germanium and are designed to form, respectively, the first and second junction regions G1, G2. Moreover, the projecting region 22 is delimited, at the top, by a temporary surface $S_p b$, on which a third preliminary region 23* extends, which is made, for example, of germanium and is designed to form the junction region 23. The first, second and third preliminary regions G1*, G2*, 23* have a thickness of, for example, 0.5 µm.

Figure 7:
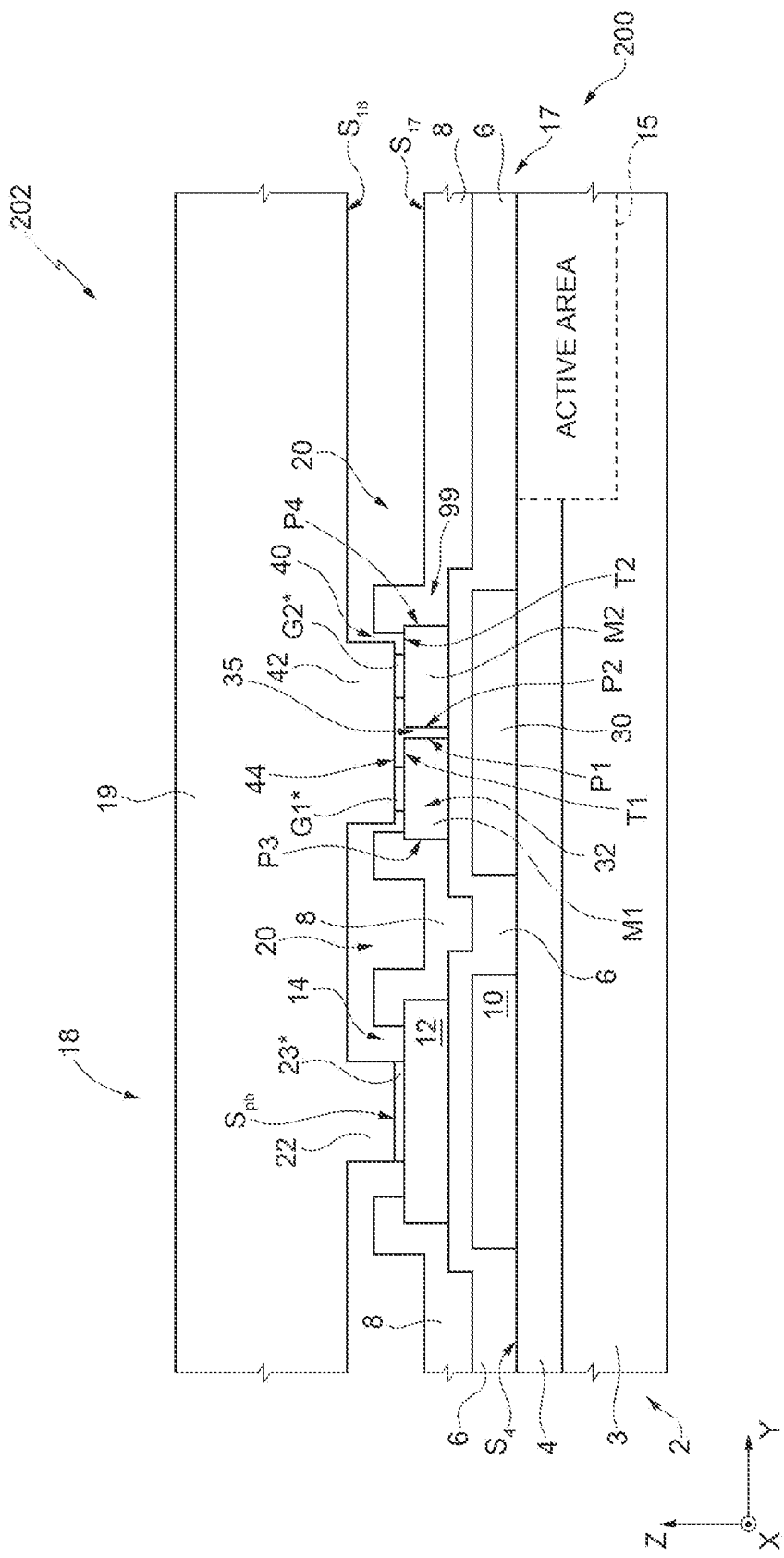
FIGS. 7 and 8 are schematic illustrations of a portion of a cross-section of a set of two semiconductor wafers, during two successive steps of the manufacturing process.

Next, as shown in FIG. 7, the second wafer 202 is flipped over and is coupled to the first wafer 200 so that the first and second preliminary regions G1*, G2* contact, respectively, the first and second top surfaces T1, T2 of the first and second filtering metallizations M1, M2, within the filtering window 40, and moreover so that the third preliminary region 23* contacts the exposed part of the first top metallization 12, within the sealing window 14.

Figure 8:
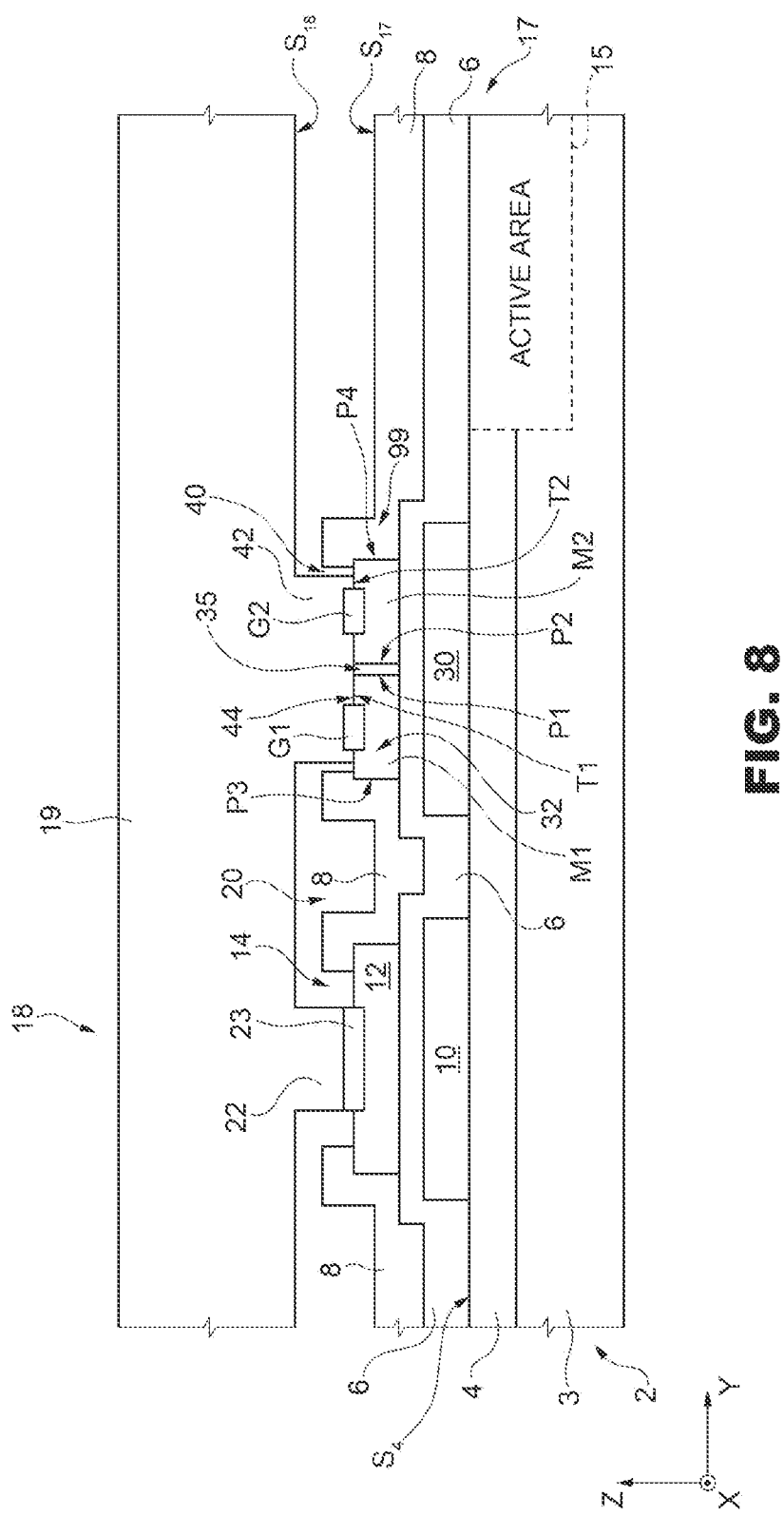

In addition, a bonding process is carried out at a temperature higher than the melting point of the eutectic alloy that forms the junction region 23 and the first and second junction regions G1, G2. In this way, there occurs interaction between germanium and aluminum and consequent transformation of the first, second and third preliminary regions G1*, G2*, 23*, respectively, into the first and second junction regions G1, G2 and into the junction region 23. Furthermore, the portions of the coupling surface 44 left exposed by the first and second preliminary regions G1*, G2*, previously (FIG. 7) separated by the first and second top surfaces T1, T2 of the first and second filtering metallizations M1, M2 abut upon the latter. There is thus formed, as shown in FIG. 8, a device that is the same as the ambient sensing device 50 illustrated in FIG. 2, but without the hole 25, which is formed subsequent to bonding, using common machining techniques of a deep-silicon-etching type (step not shown) so as to obtain the ambient sensing device 50 illustrated in FIG. 2. In a per se known manner, dicing/singulation operations can then be carried out.

Finally, it is clear that modifications and variations may be made to what has been described and illustrated herein, without departing from the scope of the present disclosure, as defined in the annexed claims.

For instance, as mentioned previously, the first and/or the second bottom metallization 10, 30 may be absent.

The exact alignment of the filtering window 40, in particular with reference to the side walls P1-P4 of the first and second filtering metallizations M1, M2, may vary with respect to what has been described.

The coupling between the projection 22 of the cap 18 and the first top metallization 12, and hence the lateral sealing of the cavity 20, may be obtained in a way different from what has been described. Likewise, the junction region 23 may have a shape and arrangement different from the one described.

In general, materials may be used different from the materials described previously. For instance, coupling between the projecting filtering region and the top metallization structure may be obtained in a way different from what has been described. In particular, the preliminary regions and the top metallization structure may be made of materials such as to enable formation of a metal bonding other than aluminum-germanium, such as for example a gold-gold or gold-tin bonding. Furthermore, bonding may be not only of a fusion type but also of an anodic type, or of a type selected from among: glass-frit, polymeric or dry-film, etc. In this case, the metallization structure is replaced by a coupling structure, which has, for example, the same shape as the metallization structure described previously, but is made of a material that may be different from a metal material, such as a dielectric or semiconductor material. The coupling structure is bonded to the projecting filtering region of the cap.

In addition, the cap may not only be made of any semiconductor (for example, silicon carbide) but also of any substrate currently used in the manufacture of integrated circuits, such as for example a vitreous substrate.

Finally, as mentioned previously, the hole in the cap may have, along the axis Z', a section of variable shape, in which case, with reference, for brevity, to a single channel, the section and/or the opening or openings have/has an area smaller than the area of the section of the hole that has the minimum area from among the sections of the hole in planes perpendicular to the direction of extension of the hole.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a substrate;
a cap on the substrate, the cap including a primary body and a projecting region that extends from the primary body;
a filtering hole extends through the primary body and through the projecting region;
a coupling structure on the projecting region of the cap, the coupling structure including:
a plurality of metallizations on the substrate and between the substrate and the projecting region;
a plurality of filtering channels delimited by the plurality of metallizations, each filtering channel of the plurality of filtering channels is delimited by at least a pair of adjacent metallizations of the plurality of metallizations and is transverse to adjacent filtering channels of the plurality of filtering channels on opposite sides of each metallization of the plurality of metallizations; and
a cavity is between the substrate and the cap.

2. The device of claim 1, further comprising a plurality of junction regions on the plurality of metallizations, and the plurality of junction regions are between the projecting region and the plurality of metallizations.

3. The device of claim 1, wherein each metallization of the plurality of metallizations includes:
a first sidewall; and
a second sidewall is transverse to the first sidewall, the second sidewall extends to the first sidewall.

4. The device of claim 3, wherein the plurality of filtering channels are delimited by respective first sidewalls of the plurality of metallizations and respective second sidewalls of the plurality of metallizations that are adjacent to each other and face each other.

5. The device of claim 1, wherein:
each filtering channel of the plurality of filtering channels includes a first dimension that extends between at least the pair of adjacent metallizations of the plurality of metallizations; and
the filtering hole includes a second dimension that extends across the filtering hole that is greater than the first dimension.

6. The device of claim 5, wherein the filtering hole is circular and the second dimension is a diameter of the filtering hole.

7. The device of claim 1, wherein the plurality of metallizations includes at least two metallizations.

8. The device of claim 7, wherein the plurality of metallizations includes at least three metallizations.

9. The device of claim 1, wherein the cavity is in fluid communication with at least one of a plurality of fluid channels and the cavity is delimited by the projecting region.

10. A method, comprising:
forming a main body including a semiconductor body and a coupling structure with at least three metallizations that laterally delimits at least three channels;
forming a cavity between the main body and a cap, positioning the at least three metallizations that laterally delimits the at least three channels between the semiconductor body and the cap, and fluidically coupling the cavity with at least one of the at least three channels by mechanically coupling the coupling structure to a projecting region of the cap projecting from a primary body of the cap; and
forming a hole extending through the primary body and the projecting region of the cap.

11. The method of claim 10, further including forming at least three junction regions on the projecting region of the cap.

12. The method of claim 11, wherein mechanically coupling the coupling structure to the projecting region of the cap further includes mechanically coupling each junction region of the at least three junction regions to a respective metallization of a plurality of metallizations.

13. The method of claim 10, wherein forming the hole extending through the primary body and the projecting region of the cap fluidically coupling the hole with the at least three channels further includes forming the hole transverse to the at least three channels.

14. The method of claim 10, wherein forming the hole occurs after coupling the cap to the coupling structure to the projecting region of the cap projecting from the primary body of the cap.

15. The method of claim 10, further comprising forming the projecting region of the cap by removing portions of the cap.

16. A device, comprising:
a cap including:
a primary body;
a projecting region that projects from the primary body; and
a hole that extends through the primary body and extends through the projecting region, the hole having a first dimension that extends across the hole;
a main body including:
a first metallization; and
a second metallization spaced apart from the first metallization;

a first channel delimited by the first metallization and the second metallization, the first channel has a second dimension that extends from the first metallization to the second metallization, the second dimension is less than the first dimension, and the first channel is in fluid communication with the hole;

a first junction region is interposed between the first metallization and the projecting region, and the first junction region couples the first metallization to the projecting region; and a second junction region on the projecting region and spaced apart from the first junction region, the second junction region couples the second metallization to the projecting region.

17. The device of claim 16, further comprising a second channel spaced apart from the first channel and in fluid communication with the hole, and wherein:

the main body further includes a third metallization spaced apart from the first metallization and the second metallization, and the second metallization is between the first metallization and the third metallization; and the second channel is delimited by the second metallization and the third metallization, the second channel includes a third dimension that extends from the second metallization to the third metallization, and the third dimension is less than the first dimension.

18. The device of claim 17, wherein the first channel is transverse to the second channel.

19. The device of claim 17, wherein the second dimension and the third dimension are equal to each other.

20. The device of claim 16, wherein:

the first metallization further includes:
  a first sidewall; and
  a second sidewall transverse to the first sidewall, the second sidewall extends to the first sidewall;

the second metallization further includes:
  a third sidewall that faces the second sidewall; and
  a fourth sidewall transverse to the third sidewall, the fourth sidewall extends to the third sidewall; and the first channel is between the second sidewall of the first metallization and the third sidewall of the second metallization.

* * * * *